(12) United States Patent
Watanabe

(10) Patent No.: US 10,136,039 B2
(45) Date of Patent: Nov. 20, 2018

(54) IMAGE PICKUP APPARATUS CAPABLE OF PREVENTING THERMAL DEFORMATION OF A FIXING MEMBER FIXED TO IMAGE PICKUP DEVICE PACKAGE

(71) Applicant: CANON KABUSHIKI KAISHA, Tokyo (JP)

(72) Inventor: Naoki Watanabe, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/489,981

(22) Filed: Apr. 18, 2017

(65) Prior Publication Data

US 2017/0318203 A1 Nov. 2, 2017

(30) Foreign Application Priority Data

Apr. 27, 2016 (JP) .................. 2016-089019

(51) Int. Cl.
*H04N 5/225* (2006.01)
*G03B 17/55* (2006.01)

(52) U.S. Cl.
CPC ........... *H04N 5/2253* (2013.01); *G03B 17/55* (2013.01); *H04N 5/2252* (2013.01)

(58) Field of Classification Search
CPC .. H04N 5/2253; H04N 5/2252; H04N 5/2251; H04N 2101/00; H04N 5/2257; G03B 17/55; H05K 7/20136; H05K 7/20154
See application file for complete search history.

(56) References Cited

U.S. PATENT DOCUMENTS

| 7,329,869 | B2 * | 2/2008 | Cassel | H04N 5/2252 |
| | | | | 250/339.03 |
| 8,094,219 | B2 * | 1/2012 | Huang | H04N 5/2253 |
| | | | | 348/294 |
| 9,188,777 | B2 * | 11/2015 | Watanabe | G02B 27/0006 |
| 9,432,561 | B2 * | 8/2016 | Samuels | G03B 17/568 |

FOREIGN PATENT DOCUMENTS

| JP | 2001-285696 A | 10/2001 |
| JP | 2012-230259 A | 11/2012 |

\* cited by examiner

*Primary Examiner* — Luong T Nguyen
(74) *Attorney, Agent, or Firm* — Cowan, Liebowitz & Latman, P.C.

(57) ABSTRACT

An image pickup apparatus which is able to prevent thermal deformation of a fixing member fixed to an image pickup device package through solder joining with a circuit substrate sandwiched therebetween, and also align the image pickup device package and the fixing member with high accuracy. The image pickup device package holds an image pickup device. The circuit substrate is electrically connected to the image pickup device via the image pickup device package. The fixing member has at least one arm portion provided with a joint portion that is solder-joined to the image pickup device package. The arm portion has a heat supply unit to which heat is externally supplied and which transfers the supplied heat to the joint portion. An area with a smaller plate thickness than that of other areas is provided around an area that transfers heat from the heat supply unit to the joint portion.

9 Claims, 11 Drawing Sheets

IMAGE PICKUP APPARATUS CAPABLE OF PREVENTING THERMAL DEFORMATION OF A FIXING MEMBER FIXED TO IMAGE PICKUP DEVICE PACKAGE

BACKGROUND OF THE INVENTION

Field of the Invention

The present invention relates to an image pickup apparatus such as a digital camera, a digital video camera, or a mobile terminal having an image pickup function.

Description of the Related Art

In an image pickup apparatus such as a digital camera, a bundle of rays from a subject is received and photoelectrically converted by an image pickup device, and an electric signal output from the image pickup device is converted into image data, which in turn is recorded on a recording medium such as a memory card. The image pickup device is comprised of a CMOS sensor, a CCD sensor, or the like, and in a state of being packaged with ceramic or the like, disposed inside the image pickup apparatus, and a rear side of the image pickup device is mounted on a circuit substrate.

In, for example, a digital single-reflex camera, a relative positional relationship among a plurality of optical components such as an image pickup device, a finder device, and an AF device needs to be precisely maintained. Specifically, the image pickup device is required to have high positional accuracy for two directions consisting of a direction of an optical axis and a direction perpendicular to the optical axis, and in addition, roll, pitch and yaw directions with respect to an axis of the two directions. The image pickup device is also required to be highly reliable against external loads such as temperature changes, vibrations, and shocks.

Conventionally, there has been proposed a technique in which a fixing member is placed between an image pickup device package and a circuit substrate, and the image pickup device package and the fixing member are bonded and fixed to each other with ultraviolet curable resin (Japanese Laid-Open Patent Publication (Kokai) No. 2012-230259). There has also been proposed a technique in which a fixing member is placed on a rear side of an image pickup device package with a circuit substrate being interposed therebetween, and an arm portion, which projects from the fixing member toward the image pickup device package, and the image pickup device package are fixed together by solder joining (see Japanese Laid-Open Patent Publication (Kokai) No. 2001-285696).

Due to recent years advanced functionality of image pickup devices such as increase in resolution and support for moving images, the number of signals output from the image pickup device package is increasing. For this reason, an SOP (Small Outline Package) called a gull-wing that has conventionally been used is running short of signal terminals. Accordingly, packages which are able to be equipped with a number of output signal terminals such as an LCC (Leaded Chip Carrier) and an LGA (Land Grid Array) are lately adopted.

For such image pickup device packages, it is inevitable that a circuit substrate is placed on a rear side of an image pickup device package. For this reason, the arrangement described in Japanese Laid-Open Patent Publication (Kokai) No. 2012-230259 in which the fixing member is placed between the image pickup device package and the circuit substrate, and the image pickup device package and the fixing member are bonded and fixed together cannot be adopted.

On the other hand, with the arrangement described in Japanese Laid-Open Patent Publication (Kokai) No. 2001-285696 in which the image pickup device package and the arm portion of the fixing member are fixed together by solder joining, misalignment occurs due to deformation of the fixing member, which is a base material, caused by thermal expansion, and hence the demand for accurate positioning cannot be met.

Particularly, as the amount of heat generated by an image pickup device is lately increasing due to advanced functionality of the image pickup device, there is a need to efficiently radiate heat from an image pickup device package, and further, there is a demand for weight reduction of an image pickup apparatus. For this reason, an aluminum alloy or the like which has excellent thermal conductivity, is lightweight, and has relatively high strength is increasingly used in place of stainless steel that has conventionally been used.

However, if an aluminum alloy is used as a material for the fixing member, heat supplied to the aluminum alloy during solder joining would be transferred faster to the overall fixing member than to stainless steel because the aluminum alloy has high thermal conductivity, and as a result, the overall fixing member tends to become hotter than in the case where stainless steel is used. Moreover, the aluminum alloy has a higher thermal expansion coefficient than stainless steel, and hence the aluminum alloy not only becomes hotter than stainless steel but also becomes thermally deformed to a large extent and thus cannot meet the demand for accurate positioning.

SUMMARY OF THE INVENTION

The present invention provides an image pickup apparatus which is able to prevent thermal deformation of a fixing member fixed to an image pickup device package through solder joining with a circuit substrate sandwiched therebetween, and also align the image pickup device package and the fixing member with high accuracy.

Accordingly, the present invention provides an image pickup apparatus comprising an image pickup device package configured to hold an image pickup device, a circuit substrate configured to be placed on a rear side of the image pickup device package and electrically connected to the image pickup device via the image pickup device package, and a fixing member configured to be placed on a rear side of the circuit substrate and have at least one arm portion provided with a joint portion that is to be solder-joined to the image pickup device package, wherein the arm portion has a heat supply unit to which heat is externally supplied and which transfers the supplied heat to the joint portion, and wherein an area with a smaller plate thickness than that of other areas is provided around an area that transfers heat from the heat supply unit to the joint portion.

According to the present invention, the fixing member fixed to then image pickup device package through solder joining with the circuit substrate sandwiched therebetween is prevented from being thermally deformed, and also the image pickup device package and the fixing member are aligned with high accuracy.

Further features of the present invention will become apparent from the following description of exemplary embodiments (with reference to the attached drawings).

DESCRIPTION OF THE EMBODIMENTS

Hereafter, embodiments of the present invention will be described with reference to the drawings.

Figure 1A:
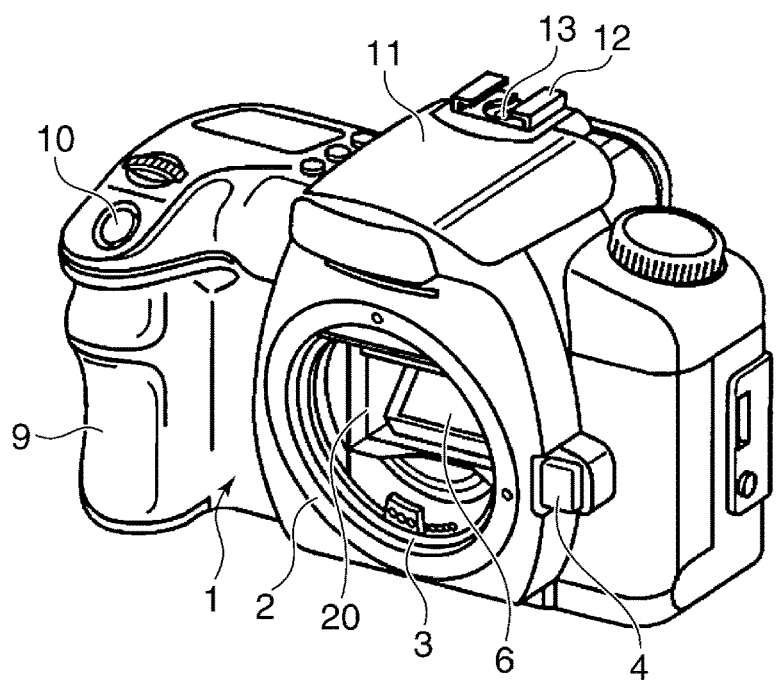
FIG. 1A is a perspective view showing a digital single-reflex camera, which is a first embodiment of an image pickup apparatus according to the present invention, as seen from a subject side.
Figure 1B:
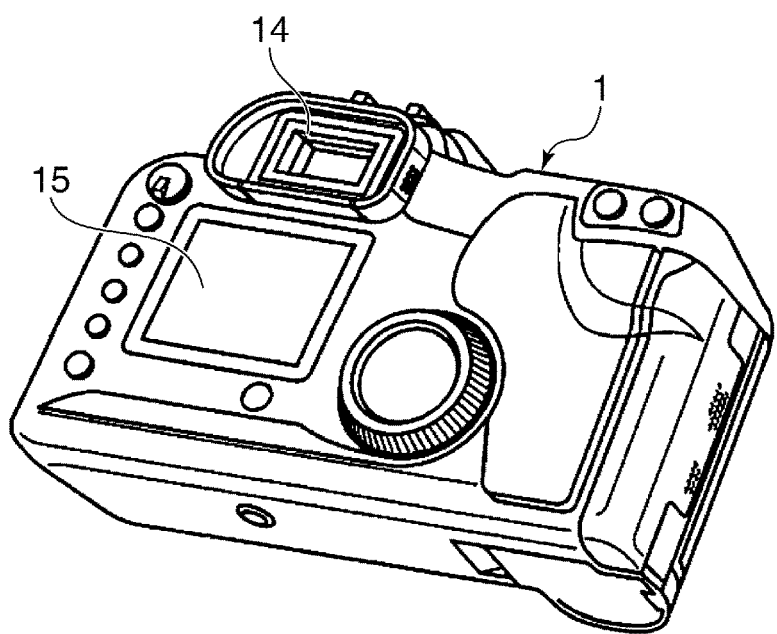
FIG. 1B is a perspective view showing the digital single-reflex camera in FIG. 1A as seen from a photographer side.

FIG. 1A is a perspective view showing a digital single-reflex camera (hereafter referred to as the camera), which is a first embodiment of an image pickup apparatus according to the present invention, as seen from a front side (subject side), and FIG. 1B is a perspective view showing the camera in FIG. 1A as seen from a rear side. It should be noted that in the present embodiment, a digital single-reflex camera is taken as an example of the image pickup apparatus, but the image pickup apparatus is not limited to this.

As shown in FIG. 1A, a mount unit 2 on which a lens unit, not shown, is removably mounted is provided on a front side of the camera 1. The mount unit 2 has a mount contact portion 3, which enables communication of control signals, status signals, data signals, and so forth between the camera 1 and the lens unit and supplies electrical power to the lens unit. In the camera 1, as viewed from the front side of the camera 1, a lock release button 4 which is operated when the lens unit is to be removed is provided on a right side of the mount unit 2, and a grip portion 9 is provided on a left side of the mount unit 2.

A quick return mirror 6 is provided inside the camera 1. The quick return mirror 6 enters a shooting optical path at the time of observation through a viewfinder, reflects a bundle of rays from a subject, which has passed through a shooting optical system of the lens unit, and guides the bundle of rays to a viewfinder optical system, not shown. At the time of shooting, the quick return mirror 6 retracts from the shooting optical path and guides a bundle of rays from a subject, which has passed through the shooting optical system of the lens unit, to an image pickup device 8 (see FIG. 5C) of an image pickup unit 20. A shutter unit (see FIG. 2), which adjusts the amount of light falling upon the image pickup device 8, is provided between the quick return mirror 6 and the image pickup unit 20.

A pop-up strobe unit 11, an accessory shoe 12, a strobe contact unit 13, a release button 10, and so forth are provided on top of the camera 1. The release button 10 is placed on top of the grip portion 9. A first stroke (e.g. pressing halfway down) of the release button 10 turns on a release switch (SW1), not shown, to start a preparation for shooting, and a second stroke (e.g. pressing all the way down) of the release button 10 turns on a release switch (SW2), not shown, to start a shooting operation.

As shown in FIG. 1B, a viewfinder eyepiece window 14, through which a photographer observes a bundle of rays from a subject reflected on the quick return mirror 6, as a subject image, is provided on top of a rear side of the camera 1, and a display unit 15 such as an LCD is provided in a substantially central part of the rear side of the camera 1.

Figure 2:
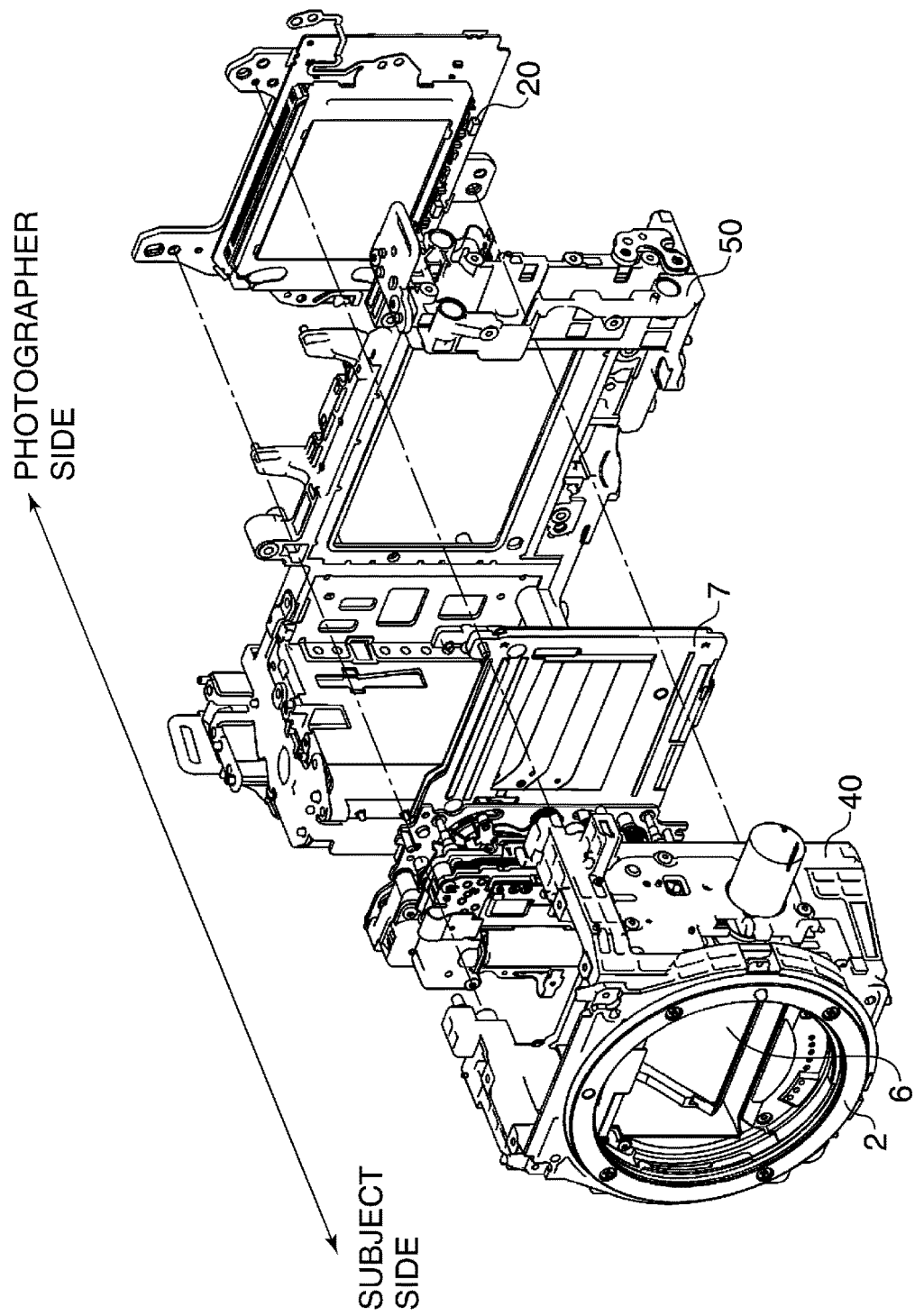
FIG. 2 is a perspective view useful in explaining an internal structure of the digital single-reflex camera.

Referring next to FIG. 2, a description will be given of an internal structure of the camera 1. FIG. 2 is a perspective view useful in explaining the internal structure of the camera 1.

As shown in FIG. 2, the mount unit 2, a mirror box unit 40, the shutter unit 7, a main base unit 50, and the image pickup unit 20 are placed in this order from the front side to the rear side along the direction of the optical axis in the camera 1. The quick return mirror 6 is rotatably supported by the mirror box unit 40. The shutter unit 7, the main base unit 50, and the image pickup unit 20 are fastened to a rear side (photographer side) of the mirror box unit 40 with screws.

The image pickup unit 20 is fastened to the mirror box unit 40 with three screws via spring members, not shown. By adjusting fastening lengths of the respective three screws individually during fastening, a light-incident plane of the image pickup device 8 of the image pickup unit 20 in relation to the mount unit 2 is adjustable in a direction of an optical axis (focus) as well as pitch/yaw directions.

Figure 3A:
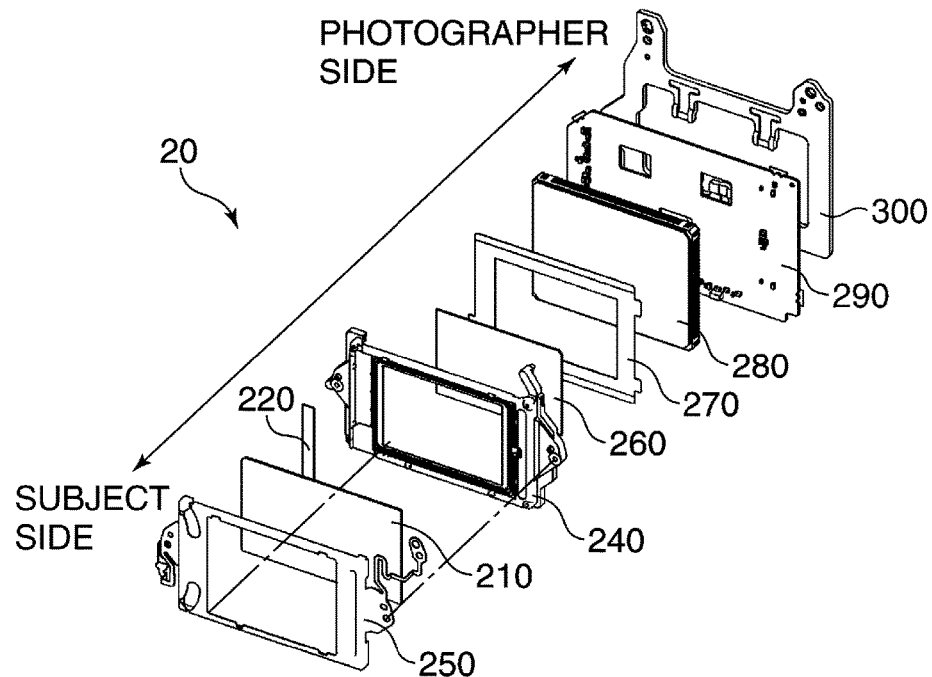
FIG. 3A is an exploded perspective view showing an image pickup unit as seen from the subject side.
Figure 3B:
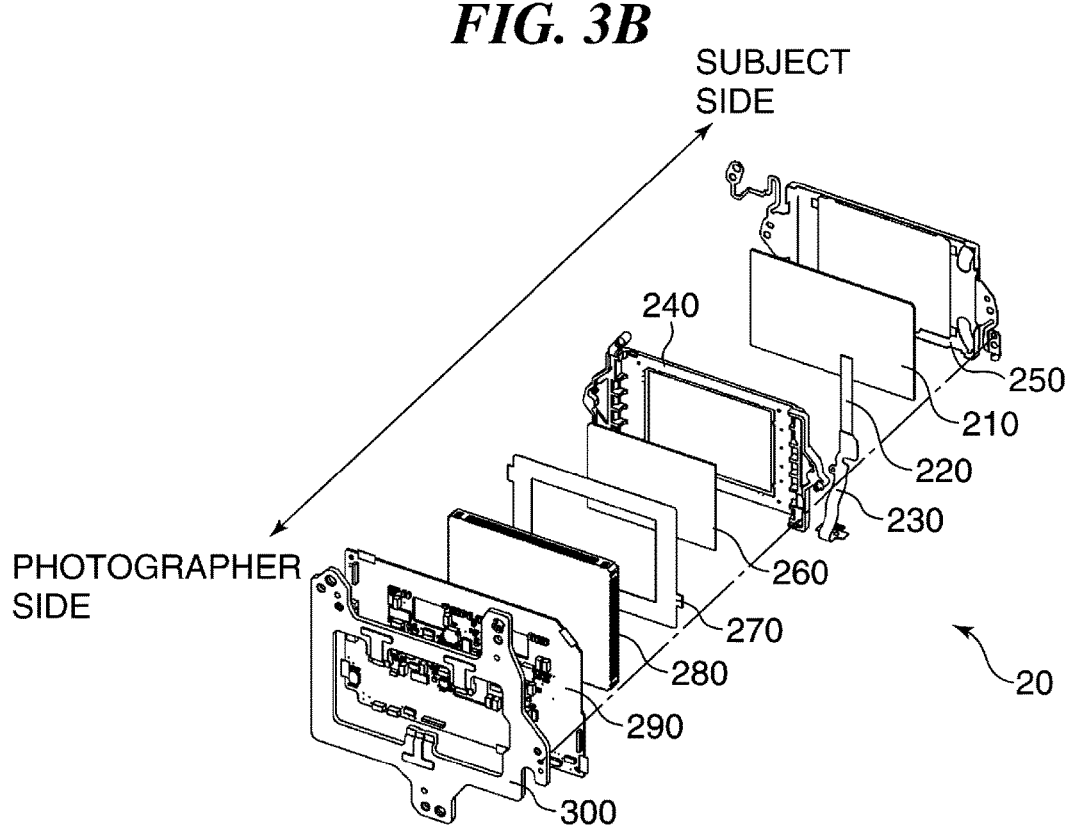
FIG. 3B is an exploded perspective view showing the image pickup unit in FIG. 3A as seen from the photographer side.
Figure 4A:
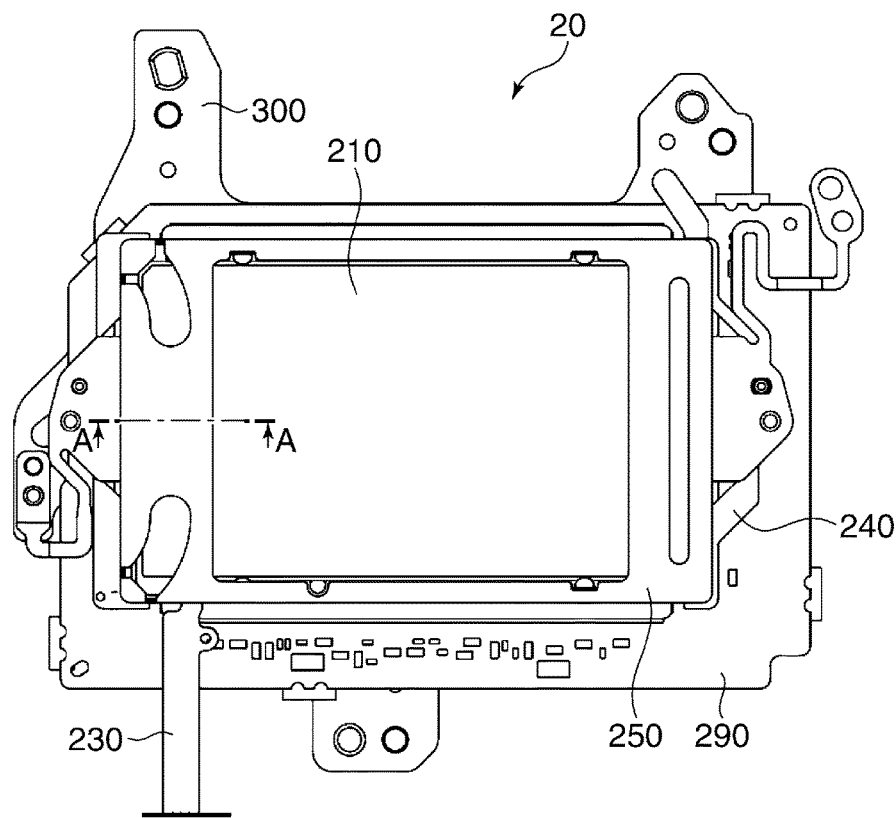
FIG. 4A is a view showing the image pickup unit as seen from a subject side in a direction of an optical axis.
Figure 4B:
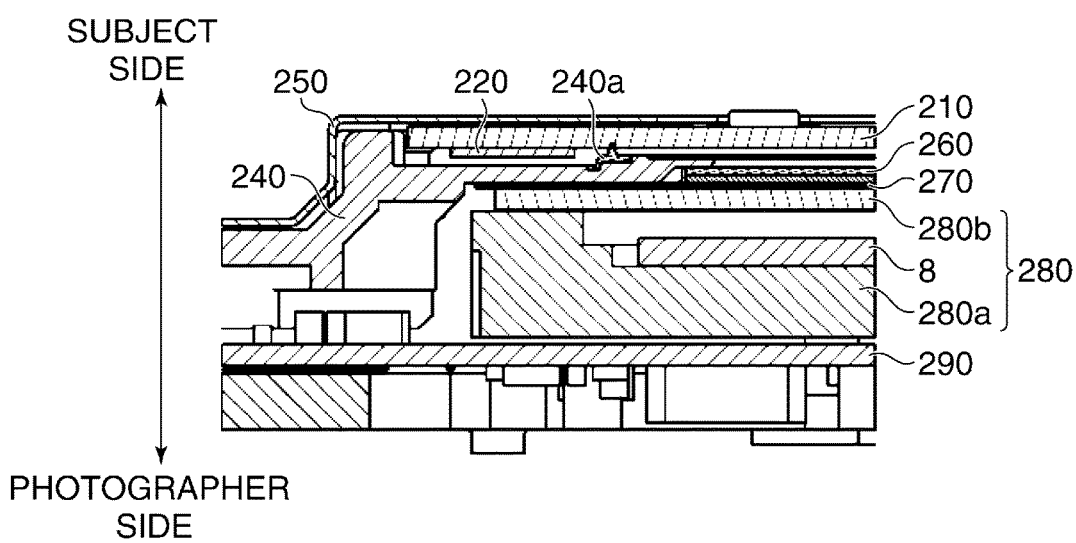
FIG. 4B is a cross-sectional view taken along line A-A in FIG. 4A.

Referring next to FIGS. 3A to 5C, a description will be given of the image pickup unit 20. FIG. 3A is an exploded perspective view showing the image pickup unit 20 as seen from the subject side, and FIG. 3B is an exploded perspective view showing the image pickup unit 20 as seen from the photographer side. FIG. 4A is a view showing the image pickup unit 20 as seen from the subject side in the direction of the optical axis, and FIG. 4B is a cross-sectional view taken along line A-A in FIG. 4A.

As shown in FIGS. 3A, 3B, 4A, and 4B, the image pickup unit 20 has an urging member 250, an optical low-pass filter 210, a holding member 240, an optical member 260, an image pickup device package 280, a circuit substrate 290, and a fixing member 300, which are placed in this order from the subject side to the photographer side.

The optical low-pass filter 210 is made of a single rectangular birefringent plate comprised of crystals, and a reed-shaped piezoelectric device 220, which vibrates the optical low-pass filter 210, is placed on one side of the optical low-pass filter 210. The piezoelectric device 220 is bonded to and held on a peripheral edge of the optical low-pass filter 210 such that long sides of the piezoelectric device 220 are placed parallel to short sides of the optical low-pass filter 210.

A flexible printed circuit board 230, which applies voltage to the piezoelectric device 220, is bonded and fixed to the piezoelectric device 220. When voltage is applied to the piezoelectric device 220, it vibrates in an expanding or contracting manner in a direction perpendicular to the optical axis, resulting in resonance of the optical low-pass filter 210. This removes foreign matter such as dust attached to surfaces of the optical low-pass filter 210.

The holding member 240 has a frame-like elastic member 240a with which the optical low-pass filter 210 is brought into intimate contact. The elastic member 240a is formed by two-color molding or insert molding or formed as a separate body.

The urging member 250, which is made of a conductive material, is fastened to the holding member 240 and the fixing member 300 with screws while urging the optical low-pass filter 210 in the direction of the optical axis. Fastened with screws, the urging member 250 is electrically connected to the fixing member 300 and also electrically connected to the optical low-pass filter 210 adjacent to the urging member 250.

The fixing member 300 is at a ground potential for the camera 1. As a result, the surfaces of the optical low-pass filter 210 as well are at the ground potential, and this prevents dust or the like from becoming electrostatically attached to the surfaces of the optical low-pass filter 210.

The optical member 260 is constructed by pasting a circularly polarizing plate, which is made of crystals, and an infrared cut filter to each other and is bonded and fixed to the holding member 240 using a double-faced tape 270. The image pickup device package 280 is placed on the photographer side of the optical member 260.

Figure 5A:
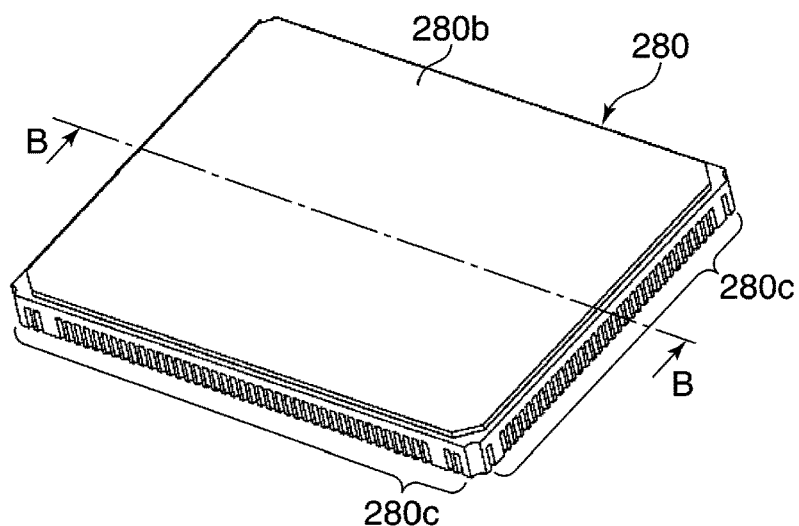
FIG. 5A is a perspective view showing an image pickup device package.
Figure 5B:
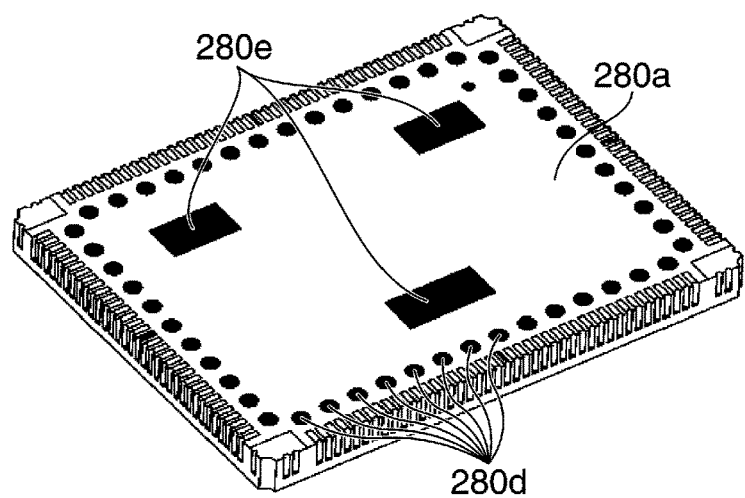
FIG. 5B is a perspective view showing the image pickup device package in FIG. 5A as seen from a rear side.
Figure 5C:
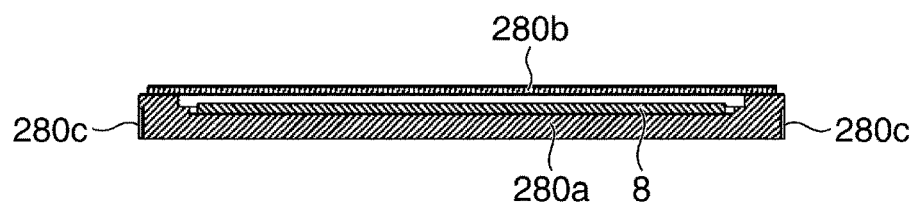
FIG. 5C is a cross-sectional view taken along line B-B in FIG. 5A.

FIG. 5A is a perspective view showing the image pickup device package 280, FIG. 5B is a perspective view showing the image pickup device package 280 as seen from behind, and FIG. 5C is a cross-sectional view taken along line B-B in FIG. 5A.

As shown in FIGS. 5A to 5C, the image pickup device package 280 has a concave box-shaped base 280a which holds the image pickup device 8. The base 280a is made of ceramic such as alumina ceramic having high thermal conductivity, and a birefringent plate 280b made of crystals is fixed to the base 280a on the subject side such that the birefringent plate 280b covers the image pickup device 8. As a result, the image pickup device 8 is held in a sealed state inside the base 280a. The birefringent plate 280b, the optical low-pass filter 210, and the optical member 260 separate a ray of light, which falls upon the image pickup device 8, into images.

The base 280a has, therein and on surfaces thereof, wires for electrical connection. The four sides of the image pickup device 8 are electrically connected to the base 280a by wire bonding, not shown, and electrically connected to side signal terminals 280c and rear signal terminals 280d, which are provided on sides and a rear side of the base 280a, via the wires inside the base 280a.

Aside from the rear signal terminals 280d, three joint portions 280e for joining to the fixing member 300 are provided on the rear side of the base 280a. The side signal terminals 280c, the rear signal terminals 280d, and the joint portions 280e are plated with Ni and Au. The circuit substrate 290 is disposed on a rear side of the image pickup device package 280.

Figure 6A:
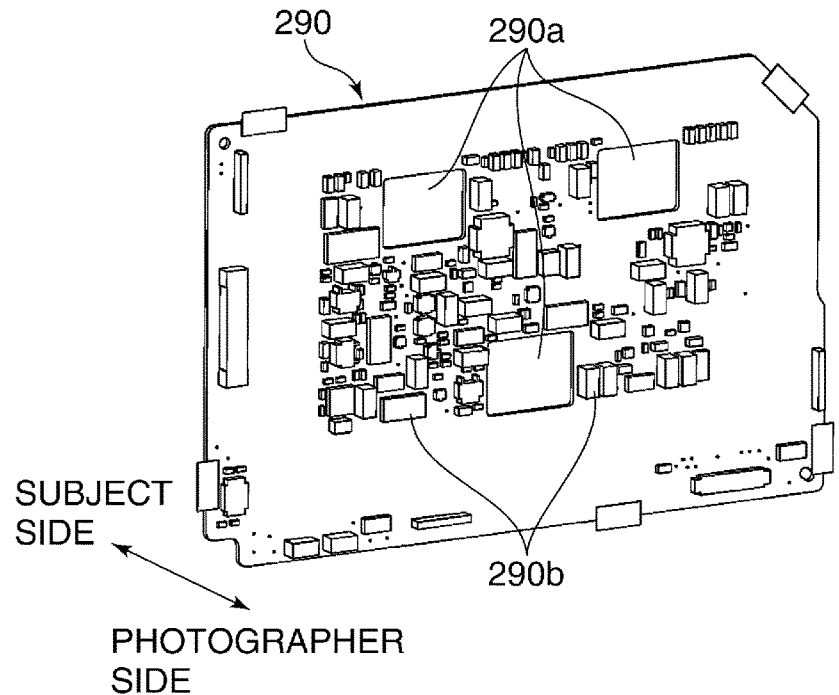
FIG. 6A is a perspective view showing a circuit substrate as seen from the photographer side.
Figure 6B:
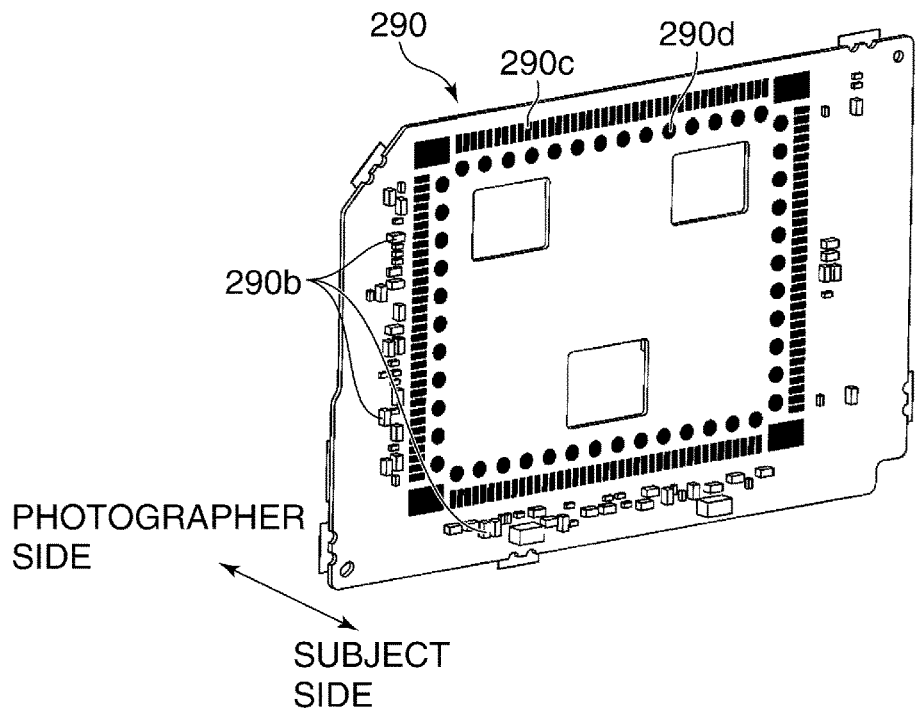
FIG. 6B is a perspective view showing the circuit substrate as seen from the subject side.

FIG. 6A is a perspective view showing the circuit substrate 290 as seen from the photographer side, and FIG. 6B is a perspective view showing the circuit substrate 290 as seen from the subject side.

As shown in FIGS. 6A and 6B, connecting portions 290c and connecting portions 290d, which are to be connected to the side signal terminals 280c and the rear signal terminals 280d of the image pickup device package 280, are provided at suitable positions on the circuit substrate 290. An electric signal output from the image pickup device 8 is processed through electrical connection of the connecting portions 290c and the connecting portions 290d to the side signal terminals 280c and the rear signal terminals 280d of the image pickup device package 280.

Moreover, rectangular openings 290a, from which the joint portions 280e of the image pickup device package 280 are to be exposed, are provided in the circuit substrate 290. Furthermore, electric components 290b such as ceramic capacitors and resistors are mounted on the circuit substrate 290. It should be noted that here, the image pickup device package 280 and the circuit substrate 290, on which the electric components 290b are mounted, are shown in the different figures for the convenience of explanation, but actually, the image pickup device package 280 and the electric components 290b are mounted on the circuit substrate 290 at the same time. The fixing member 300 is disposed on a rear side of the circuit substrate 290.

Figure 7:
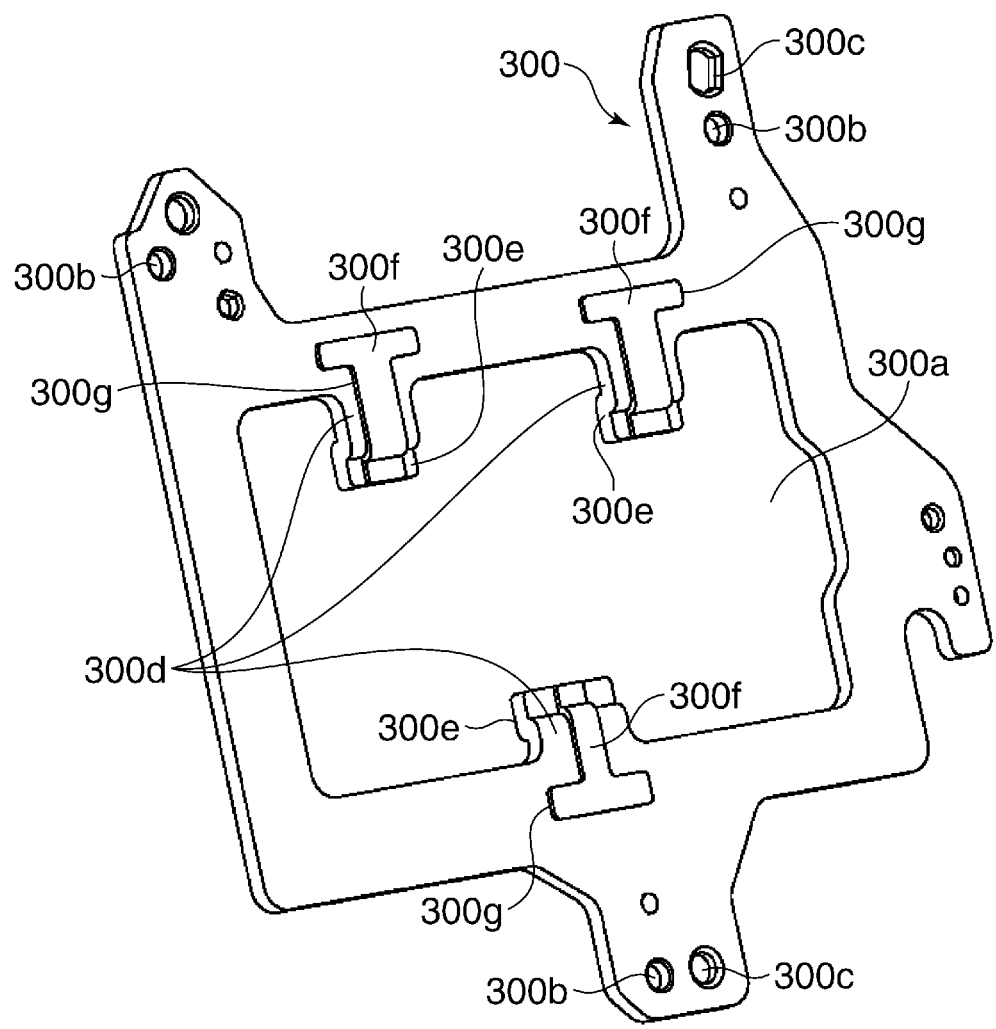
FIG. 7 is a perspective view showing a fixing member as seen from the photographer side.

FIG. 7 is a perspective view showing the fixing member 300 as seen from the photographer side. The fixing member 300 is molded by stamping a plate material such as an aluminum alloy, and surfaces of the fixing member 300 are plated with Ni. The fixing member 300 has a substantially rectangular opening 300a in a central part thereof and also has three screw holes 300b through which the fixing member 300 is to be fastened to the mirror box unit 40. Two fitting holes 300c for alignment with the mirror box unit 40 are provided close to the screw holes 300b.

Three arm portions 300d projecting inward are provided in an inner peripheral portion of the opening 300a which is substantially rectangular. Joint portions 300e, which are to be joined to the joint portions 280e of the image pickup device package 280, are provided at ends of the arm portions 300d, and the joint portions 300e are bent toward the image pickup device package 280 (subject side).

On a rear side (photographer side) of the arm portions 300d, convex portions 300f projecting rearward are formed by half blanking, drawing, or the like. The convex portions 300f function as heat supply portions to which heat is externally supplied and transfer the supplied heat to the joint portions 300e. The convex portions 300f are extended from the ends of the arm portions 300d, that is, from the joint portions 300e to an outer side of the opening 300a, and stepped portions 300g are formed at boundaries between the convex portions 300f and a rear surface of the fixing member 300. It should be noted that detailed description of the convex portions 300f and the stepped portions 300g will be given later.

Referring now to FIGS. 8A to 9C, a description will be given of how the image pickup device package 280 and the fixing member 300 are aligned with each other and solder-joined to each other.

Figure 8A:
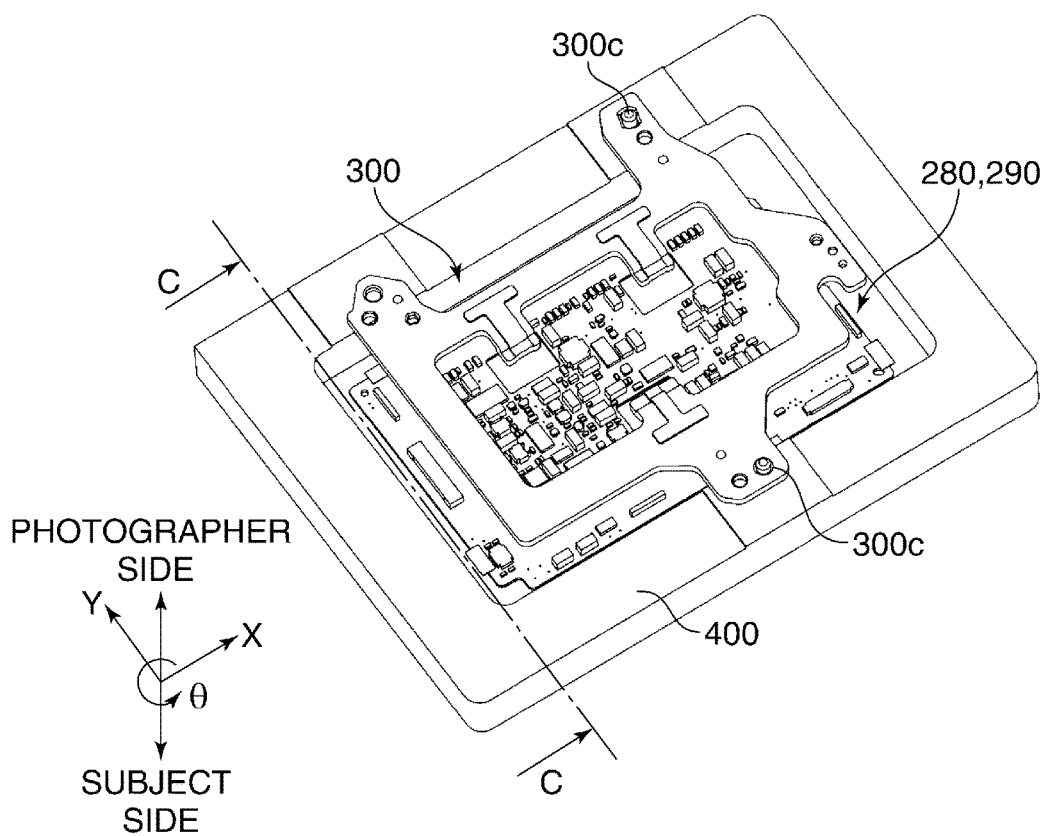
FIG. 8A is a perspective view useful in explaining how to align the image pickup device package and the fixing member with each other.
Figure 8B:
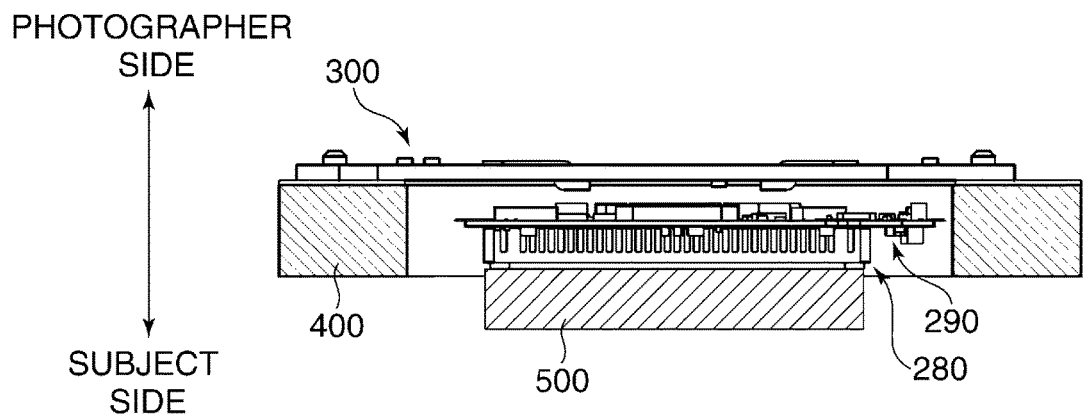
FIG. 8B is a cross-sectional view taken along line C-C in FIG. 8A.

FIG. 8A is a perspective view useful in explaining how the image pickup device package 280 and the fixing member 300 are aligned with each other, and FIG. 8B is a cross-sectional view taken along line C-C in FIG. 8A.

As shown in FIG. 8A, the image pickup device 280 is mounted on the circuit substrate 290 to form an integral unit, and the fixing member 300 is placed on a holding stage 400 from the circuit substrate 290 side. In this state, the joint portions 300e of the fixing member 300 are solder-joined to the joint portions 280e of the image pickup device package 280. During the joining, the fixing member 300 is aligned on the holding state 400 through the fitting holes 300c.

On the other hand, the image pickup device package 280 and the circuit substrate 290 are placed on an adjustment stage 500 located away from the fixing member 300. The adjustment stage 500 is movable in two planer directions (directions X and Y in FIG. 8A) perpendicular to the optical axis as well as a roll direction of the camera 1 (a direction θ in FIG. 8A), and a position of the image pickup device 8 is adjusted by moving the adjustment stage 500.

Then, positioning of the image pickup device 8 in relation to the mount unit 2 is completed by attaching the image pickup device package 280, a position of which has been adjusted in relation to the fixing member 300, to the mirror box unit 40 through the fitting holes 300c of the fixing member 300. As for the other directions i.e. the direction of the optical axis (focus) and the yaw/pitch directions of the camera 1, the direction of the optical axis and the yaw/pitch direction of the image pickup unit 20 are adjusted by adjusting the fastening lengths of the three screws when the image pickup unit 20 is fastened to the mirror box unit 40 as described earlier.

After the alignment of the image pickup device package 280 and the fixing member 300 is completed, solder is supplied to an area close to the joint portions 300e and heated to be molten so that the image pickup device package 280 and the fixing member 300 can be joined together. Since the joint portions 280e of the image pickup device package 280 and the fixing member 300 are plated with Ni, an alloy layer is formed by Ni and Sn, which is a main component of solder, and this achieves high joint strength and desirable thermal conductivity and electric conductivity.

Figure 9A:
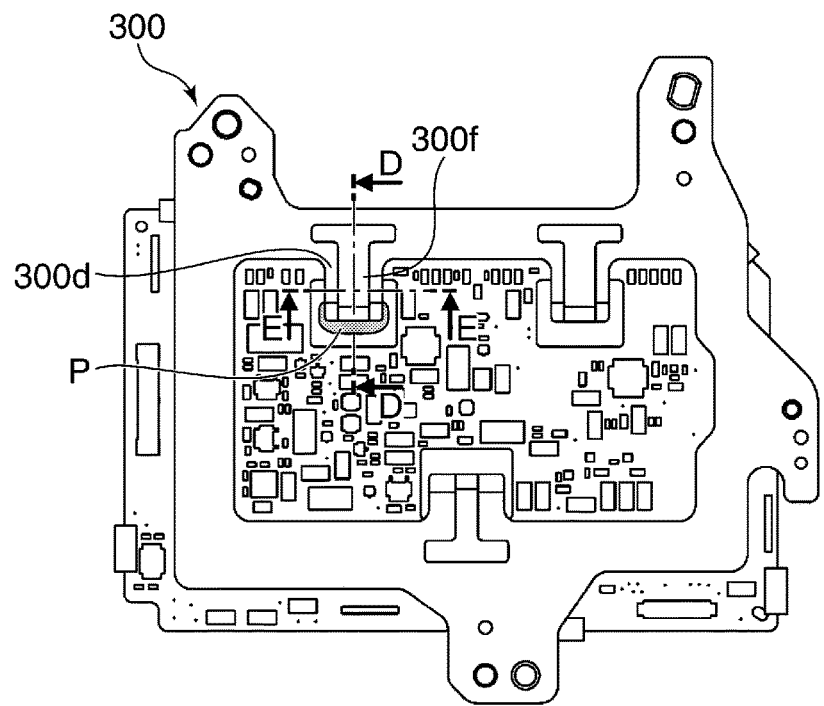
FIG. 9A is a perspective view useful in explaining a process in which an arm portion of the fixing member and the image pickup device package are solder-joined together.
Figure 9B:
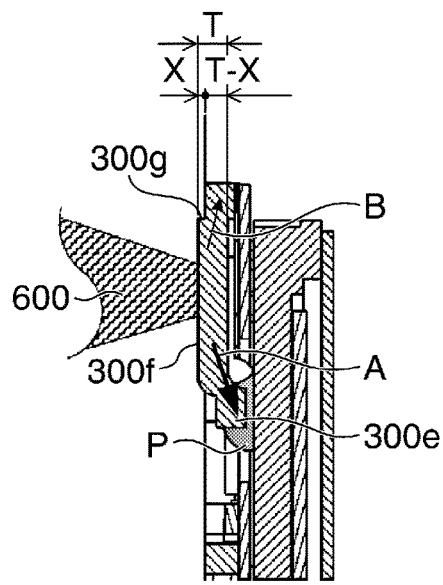
FIG. 9B is a cross-sectional view taken along line D-D in FIG. 9A.
Figure 9C:
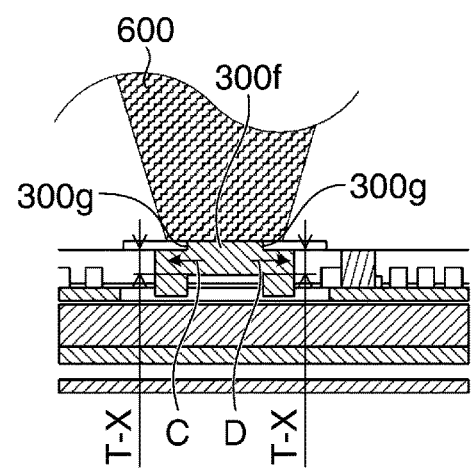
FIG. 9C is a cross-sectional view taken along line E-E in FIG. 9A.

FIG. 9A is a perspective view useful in explaining a process in which the upper left arm portion 300d among the three arm portions 300d of the fixing member 300 as seen from the photographer side is solder-joined to the image pickup device package 280, FIG. 9B is a cross-sectional view taken along line D-D in FIG. 9A, and FIG. 9C is a cross-sectional view taken along line E-E in FIG. 9A.

Ordinarily, in soldering, a solder iron 600 is brought into contact with a joint area or its vicinity. In the present embodiment, however, the electric components 290b mounted on the circuit substrate 290 lie close to the joint portions 300e of the fixing member 300, and hence a sufficient space with which the soldering iron 600 is brought into contact cannot be secured. For this reason, the soldering iron 600 is brought into contact with the photographer side of the arm portion 300d of the fixing member 300.

In the present embodiment, in order to efficiently heat and melt solder P, the convex portion 300f is provided on the photographer side of the fixing member 300 including the arm portion 300d. The convex portion 300f projects toward the photographer side, and at a boundary between the convex portion 300f and its peripheral area, the stepped portion 300g is formed, and hence a plate thickness of the fixing member 300 is changed locally.

Referring next to FIGS. 9B and 9C, a description will be given of a path over which heat is transferred from the convex portion 300f when the soldering iron 600 is brought into contact with the convex portion 300f. Referring to FIGS. 9B and 9C, assuming that the plate thickness of the fixing member 300 is T, the stepped portion 300g is formed around the convex portion 300f, and accordingly, the plate thickness T is locally reduced by an amount corresponding to a step height X of the stepped portion 300g. Therefore, a cross section of the stepped portion 300g in a heat transfer direction is small, and thermal resistance is high.

As a result, heat comes to resist being transferred in a direction indicated by an arrow B in FIG. 9B and directions indicated by arrows C and D in FIG. 9C, whereas in a direction indicated by an arrow A in FIG. 9B, thermal resistance is unchanged because no stepped portion 300g is formed. For this reason, as compared to the directions indicated by the arrows B, C, and D, a large amount of heat is transferred in the direction indicated by the arrow A, that is, to the joint portions 300e at the end of the arm portion 300d. The heat transferred in the directions indicated by the arrows B, C, and D is dispersed over the whole fixing member 300 without contributing to soldering.

As described above, by forming the stepped portions 300g around the convex portions 300f provided in the fixing member 300, the path over which heat supplied to the fixing member 300 is transferred is controlled to prevent transfer of excessive heat to the fixing member 300. This prevents thermal deformation of the fixing member 300 during soldering and also prevents deformation of the fixing member 300 after its alignment with the image pickup device package 280, that is, misalignment of the image pickup device package 280.

As a way to control the path over which heat supplied to the fixing member 300 is transferred, for example, forming a hole near a base end of the arm portion 300d is conceivable. Forming a hole, however, would reduce stiffness of the arm portion 300d against bending in the direction of the optical axis. In the present embodiment, since the convex portion 300f is formed parallel to the direction in which the arm portion 300d projects, thermal deformation of the fixing member 300 is prevented while stiffness of the arm portion 300d is increased.

Figure 10:
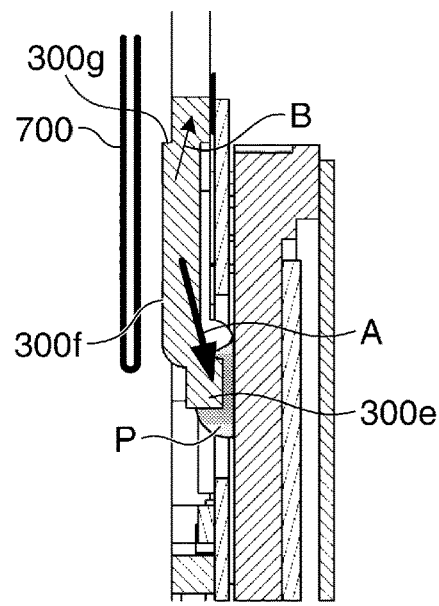
FIG. 10 is a view useful in explaining how to heat a convex portion through high-frequency induction heating in the cross-section along line D-D in FIG. 9A.

It should be noted that although in the above description of the present embodiment, the convex portion 300f is heated by bringing the soldering iron 600 into contact with it, the convex portion 300f may be heated through high-frequency induction heating. FIG. 10 is a view useful in explaining how to heat the convex portion 300f through the high-frequency induction heating in the cross-section along line D-D in FIG. 9A.

As shown in FIG. 10, in the high-frequency induction heating, an induction heating coil 700 is placed close to an object to be heated (in the present embodiment, the convex portion 300f of the fixing member 300), which is a conductor, and high-frequency electric current is applied to the induction heating coil 700. As a result, eddy current is excited in the convex portion 300f of the fixing member 300 located close to the induction heating coil 700 by high-frequency induction, and the convex portion 300f of the fixing member 300 generates heat by Joule heating. Namely, in the high-frequency induction heating, a heat generating source is an area close to the induction heating coil 700.

By providing the fixing member 300 with the convex portion 300f as in the present embodiment, the convex portion 300f is made available as a heat generating source. Moreover, the presence of the stepped portion 300g around the convex portion 300*f* has the effect of preventing heat supplied to the convex portion 300*f* from being transferred to areas other than the joint portion 300*e*. It should be noted that the induction heating coil 700 has the property of causing a conductor nearby to generate heat, and hence in the case where the electronic component 290*b* mounted on the circuit substrate 290 are located close to the joint portions 300*e* as in the present embodiment, the induction heating coil 700 cannot be placed close to the joint portions 300*d*. For this reason, the present embodiment is effective even in the case where the high-frequency induction heating is used.

As described above, in the present embodiment, since the arm portion 300*d* of the fixing member 300 is provided with the convex portion 300*f*, heat is efficiently transferred to the joint portion 300*e* while heat transfer to areas other than the joint portion 300*e* is prevented. This prevents thermal deformation of areas other than areas where heating of the fixing member 300 is given priority, and also prevents the image pickup device package 280 aligned with the fixing member 300 from becoming misaligned during solder joining.

This prevents thermal deformation of the fixing member 300, which is fixed to the image pickup device package 280 by solder joining with the circuit substrate 290 sandwiched therebetween, and also aligns the image pickup device package 280 and the fixing member 300 with each other with high accuracy.

Figure 11:
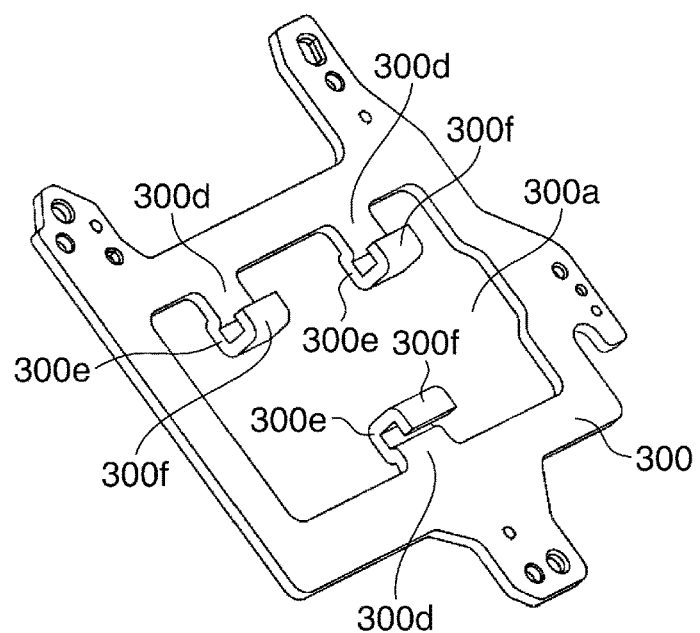
FIG. 11 is a perspective view showing a fixing member in a digital single-reflex camera that is a second embodiment of the image pickup apparatus according to the present invention.

Referring next to FIG. 11, a description will be given of a camera which is a second embodiment of the image pickup apparatus according to the present invention. FIG. 11 is a perspective view showing the fixing member 300. For parts corresponding to or equivalent to those of the first embodiment described above, the same figures and reference symbols are used, only features different from those of the first embodiment being described below.

In the present embodiment, as showing n FIG. 11, the convex portions 300*f* project parallel to the optical axis from ends of the joint portions 300*e* in the arm portions 300*d* toward the rear side (photographer side) and are extended in a direction perpendicular to the optical axis from the projecting ends toward the outer side of the opening 300*a*. Namely, the convex portions 300*f* are formed by bending instead of half blanking or the like employed in the first embodiment described above.

The convex portions 300*f* may be heated either by bringing the soldering iron 600 into contact with it or through high-frequency induction heating using the induction heating coil 700, but high-frequency induction heating is more preferable. In the present embodiment, heat supplied to the convex portions 300*f* is transferred to the joint portions 300*e* while being hardly lost, and excessive heat transfer to areas other than the joint portions 300*e* is prevented because those areas are located satisfactorily away from the induction heating coil 700. This prevents thermal deformation of the fixing member 300 caused by heating after alignment of the image pickup device package 280, and also prevents the image pickup device package 280 from becoming misaligned. The other constitution and operational advantages are the same as those of the first embodiment described above.

Figure 12:
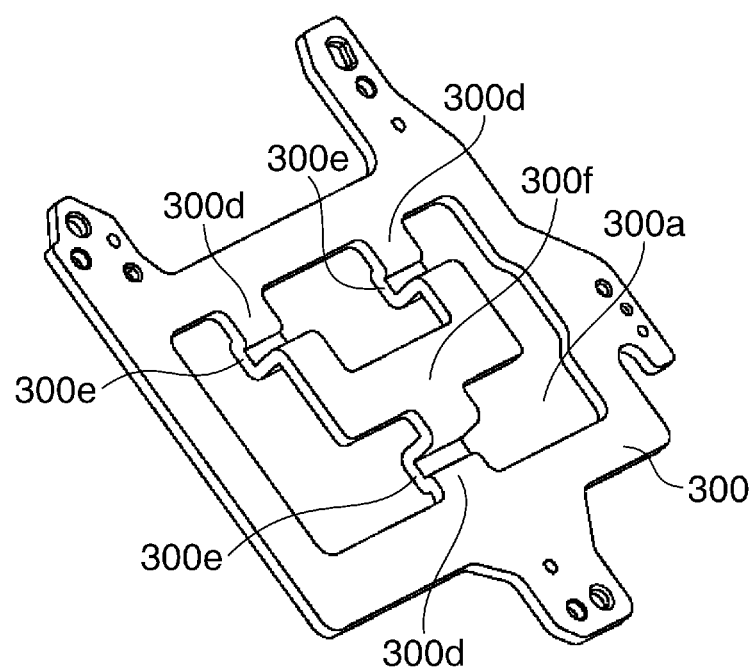
FIG. 12 is a perspective view showing a fixing member in a digital single-reflex camera that is a third embodiment of the image pickup apparatus according to the present invention.

Referring next to FIG. 12, a description will be given of a camera which is a third embodiment of the image pickup apparatus according to the present invention. FIG. 12 is a perspective view showing the fixing member 300. It should be noted that in the present embodiments, for parts corresponding to or equivalent to those of the first and second embodiments described above, the same figures and reference symbols are used, only features different from those of the first embodiment being described below.

In the present embodiment, as shown in FIG. 12, the convex portions 300*f* project parallel to the optical axis from the joint portions 300*e* in the arm portions 300*d* of the fixing member 300 toward the rear side (photographer side) and are extended in a direction perpendicular to the optical axis from the projecting ends toward an inner side of the opening 300*a*. The convex portions 300*f* provided in the respective three arm portions 300*d* are connected integrally with the arm portions 300*d* along a surface perpendicular to the optical axis. Namely, in the present embodiment, the plurality of convex portions 300*f* is connected integrally with one another by bending and drawing instead of half blanking or the like employed in the first embodiment described above.

The plurality of convex portions 300*f* connected integrally with one another may be heated either by bringing the soldering iron 600 into contact with it or through high-frequency induction heating using the induction heating coil 700, but high-frequency induction heating is more preferable as with the second embodiment described above. This enables simultaneous heating of the three joint portions 300*e* and reduces man-hours for solder-joining. The other constitution and operational advantages are the same as those of the first embodiment described above.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-089019, filed Apr. 27, 2016 which is hereby incorporated by reference herein in its entirety.

What is claimed is:

1. An image pickup apparatus comprising:
an image pickup device package configured to hold an image pickup device;
a circuit substrate configured to be placed on a rear side of the image pickup device package and electrically connected to the image pickup device via the image pickup device package; and
a fixing member configured to be placed on a rear side of the circuit substrate and have at least one arm portion provided with a joint portion that is to be solder-joined to the image pickup device package,
wherein the at least one arm portion has a heat supply unit to which heat is externally supplied and which transfers the supplied heat to the joint portion, and
wherein an area with a smaller plate thickness than the plate thickness of other areas is provided around an area that transfers heat from the heat supply unit to the joint portion.

2. The image pickup apparatus according to claim 1, wherein the fixing member has an opening, and the at least one arm portion is projected inward from an inner peripheral portion of the opening.

3. The image pickup apparatus according to claim 1, wherein the area that transfers heat from the heat supply unit of the at least one arm portion to the joint portion is formed by drawing or half blanking.

4. The image pickup apparatus according to claim 1, wherein the area that transfers heat from the heat supply unit of the at least one arm portion to the joint portion is projected toward a rear side of the fixing member.

5. The image pickup apparatus according to claim 1, wherein the fixing member is made of an aluminum alloy.

6. An image pickup apparatus comprising:
an image pickup device package configured to hold an image pickup device;
a circuit substrate configured to be placed on a rear side of the image pickup device package and electrically connected to the image pickup device via the image pickup device package; and
a fixing member configured to be placed on a rear side of the circuit substrate and have at least one arm portion provided with a joint portion that is to be solder-joined to the image pickup device package,
wherein the at least one arm portion has a heat supply unit to which heat is externally supplied and which transfers the supplied heat to the joint portion, and
wherein the heat supply unit is placed closer to an end of the at least one arm portion than the joint portion, and an area that transfers heat from the heat supply unit of the arm portion to the joint portion is projected toward a rear side of the fixing member.

7. The image pickup apparatus according to claim 6, wherein the fixing member has an opening, and the at least one arm portion is projected inward from an inner peripheral portion of the opening.

8. The image pickup apparatus according to claim 7, the fixing member has a plurality of arm portion, and areas that are provided in respective arm portions and transfer heat from the heat supply unit to the joint portion are connected integrally with one another along a surface substantially perpendicular to an optical axis.

9. The image pickup apparatus according to claim 6, wherein the fixing member is made of an aluminum alloy.

* * * * *